US012367340B2

(12) United States Patent
Moros Ortiz et al.

(10) Patent No.: US 12,367,340 B2
(45) Date of Patent: Jul. 22, 2025

(54) CONTEXT AWARE PERSONALIZATION

(71) Applicant: International Business Machines Corporation, Armonk, NY (US)

(72) Inventors: Jorge Andres Moros Ortiz, Melbourne (AU); Christine T. Wolf, Newman, CA (US); Khoi-Nguyen Dao Tran, San Jose, CA (US); Erick Oduor, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 238 days.

(21) Appl. No.: 17/136,186

(22) Filed: Dec. 29, 2020

(65) Prior Publication Data

US 2022/0207234 A1 Jun. 30, 2022

(51) Int. Cl.
*G06F 40/253* (2020.01)
*G06F 40/51* (2020.01)
*G06F 40/56* (2020.01)
*G06F 40/58* (2020.01)
*G06N 20/00* (2019.01)

(52) U.S. Cl.
CPC ............ *G06F 40/253* (2020.01); *G06F 40/51* (2020.01); *G06F 40/56* (2020.01); *G06F 40/58* (2020.01); *G06N 20/00* (2019.01)

(58) Field of Classification Search
CPC ........ G06F 40/253; G06F 40/51; G06F 40/56; G06F 40/58; G06F 40/30; G06N 20/00
See application file for complete search history.

(56) References Cited

U.S. PATENT DOCUMENTS

| 8,464,150 B2 | 6/2013 | Davidson et al. |
| 8,935,150 B2 | 1/2015 | Christ |

(Continued)

FOREIGN PATENT DOCUMENTS

| AU | 2013271849 | 12/2013 |
| EP | 3629247 A1 * | 4/2020 |

OTHER PUBLICATIONS

Shokouhi, Milad, "Learning to Personalize Query Auto-Completion", SIGIR '13: Proceedings of the 36th International ACM SIGIR Conference on Research and Development in Information Retrieval, pp. 103-112, Jul. 2013.

(Continued)

*Primary Examiner* — Daniel C Washburn
*Assistant Examiner* — Paul J. Mueller
(74) *Attorney, Agent, or Firm* — Amin, Turocy & Watson, LLP

(57) ABSTRACT

A computer system, a computer program product, and a computer-implemented system are provided for leveraging a national language processing (NLP) system for dynamically generating natural language output data. A NLP module investigates text or communication data from one or more platforms and derives global characteristic data from the investigated data. The derived global characteristic data is subject to modulation with a captured local writing style corresponding to a captured relationship. Contextual information is dynamically identified. Real-time natural language output communication data is generated that incorporates communication dynamics from the modulated global characteristic data and the dynamically identified contextual information.

20 Claims, 8 Drawing Sheets

(56) References Cited

U.S. PATENT DOCUMENTS

| | | | |
|---|---|---|---|
| 9,218,333 B2 | 12/2015 | Liensberger | |
| 9,600,228 B2 | 3/2017 | Gur et al. | |
| 10,126,936 B2 | 11/2018 | Badger et al. | |
| 10,235,470 B2 | 3/2019 | Gur et al. | |
| 2007/0299824 A1* | 12/2007 | Pan | G06F 40/30 |
| 2010/0223341 A1* | 9/2010 | Manolescu | H04L 51/02 |
| | | | 709/224 |
| 2014/0372362 A1* | 12/2014 | Miller | G06N 5/02 |
| | | | 706/50 |
| 2016/0357767 A1 | 12/2016 | Sood et al. | |
| 2017/0091168 A1 | 3/2017 | Bellegarda et al. | |
| 2017/0109336 A1* | 4/2017 | Bruno | G06F 40/103 |
| 2017/0262431 A1* | 9/2017 | Alam | G06F 40/30 |
| 2019/0156205 A1* | 5/2019 | Gebre | G06N 3/048 |
| 2021/0042378 A1* | 2/2021 | Shaaban | G06F 16/288 |

OTHER PUBLICATIONS

Galassi, A., et al., "Attention in Natural Language Processing", arXiv: 1902.02181v2, May 28, 2020.

Song, D., et al., "TR Discover: A Natural Language Interface for Querying and Analyzing Interlinked Datasets", Conference: The 1th International Semantic Web Conference, Oct. 2015.

Anonymous, "Context and Cognitive-State Based Suggestions and Formatting of the Communication Contents", IPCOM000261628D, Mar. 23, 2020.

Anonymous, "Using Metadata to Improve Query Autocompletion Suggestions", IPCOM000260610D, Dec. 11, 2019.

\* cited by examiner

CONTEXT AWARE PERSONALIZATION

BACKGROUND

The disclosed embodiments relate to a computer system, a computer program product, and a method using artificial intelligence ("AI") for dynamically generating natural language (NL) communication data. It is understood that systems are available to provide suggestions focused on grammatical and spelling corrections, or auto-completion using a predefined dictionary. However, these systems do not apply or incorporate context based suggestions. Accordingly, embodiments are provided to apply AI for dynamically managing and leveraging multi-faceted characteristic and device data, and selectively incorporating such data in the NL communication data.

SUMMARY

The embodiments disclosed herein include a computer system, a computer program product, and a method for using artificial intelligence ("AI") to dynamically generate output communication data, and in particular the embodiments base the data generation on global characteristic data and dynamically identified contextual information. This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

An aspect of a first embodiment provides a computer system including a processing unit operatively coupled to memory and an artificial intelligence (AI) platform in communication with the processing unit. The AI platform includes one or more tools to dynamically generate output communication data. The AI platform includes a personalization module configured to capture data from one or more communication platforms and derive global characteristic data from the captured data. The derived global characteristic data is subject to modulated with a local writing style corresponding to a captured relationship. The AI platform further includes a contextual model configured to dynamically identify contextual information, and a composition module configured to incorporate communication dynamics from the modulated global characteristic data and the dynamically identified contextual information. The composition module generates natural language output data in real-time. In an embodiment, an interface operatively coupled to the AI platform is provided as a venue to support and enable selective acceptance of the generated NL output communication data, with the interface supporting functionality to transmit the generated NL output communication data, accept the generated NL output communicate data in-part, or reject the generated NL output communication data.

An aspect of a second embodiment provides a computer program product to dynamically generate output communication data. The computer program product includes a computer readable storage medium having program code embodied therewith. The program code is executable by a processor to capture data from one or more communication platforms and derive global characteristic data from the captured communications. Program code modulates the derived global characteristic data with a captured local writing style corresponding to a captured relationship. Program code is further provided and executable to dynamically identify contextual information. In addition, program code is further provided and executable to incorporate communication dynamics from the modulated global characteristic data and the dynamically identified contextual information, and to generate natural language output data in real-time. In an embodiment, program code is provided to support and enable selective acceptance of the generated NL output communication data, with the program code supporting functionality to transmit the generated NL output communication data, accept the generated NL output communicate data in-part, or reject the generated NL output communication data.

An aspect of a third embodiment provides a computer-implemented method to dynamically generate output communication data. Data from one or more communication platforms is captured, and global characteristic data is derived from the captured data. The derived global characteristic data is subject to modulation, or in an exemplary embodiment a modulation process, with a captured local writing style corresponding to a captured relationship. Contextual information is dynamically identified and natural language (NL) output data is generated in real-time, with the NL generated data incorporating communication dynamics from the modulated global characteristic data and the dynamically identified contextual information. In an embodiment, the method supports selective acceptance of the generated NL output communication data, including functionality to transmit the generated NL output communication data, accept the generated NL output communicate data in-part, or reject the generated NL output communication data.

Other aspects of the invention, including machines, devices, products, code, systems, methods, and processes will become more apparent from the following detailed description of exemplary embodiments, taken in conjunction with the accompanying drawings.

BRIEF DESCRIPTION OF THE SEVERAL VIEWS OF THE DRAWINGS

The drawings referenced herein form a part of the specification and are incorporated herein. Features shown in the drawings are meant as illustrative of only some embodiments, and not of all embodiments, unless otherwise explicitly indicated.

DETAILED DESCRIPTION OF EXEMPLARY EMBODIMENTS

Figure 1:
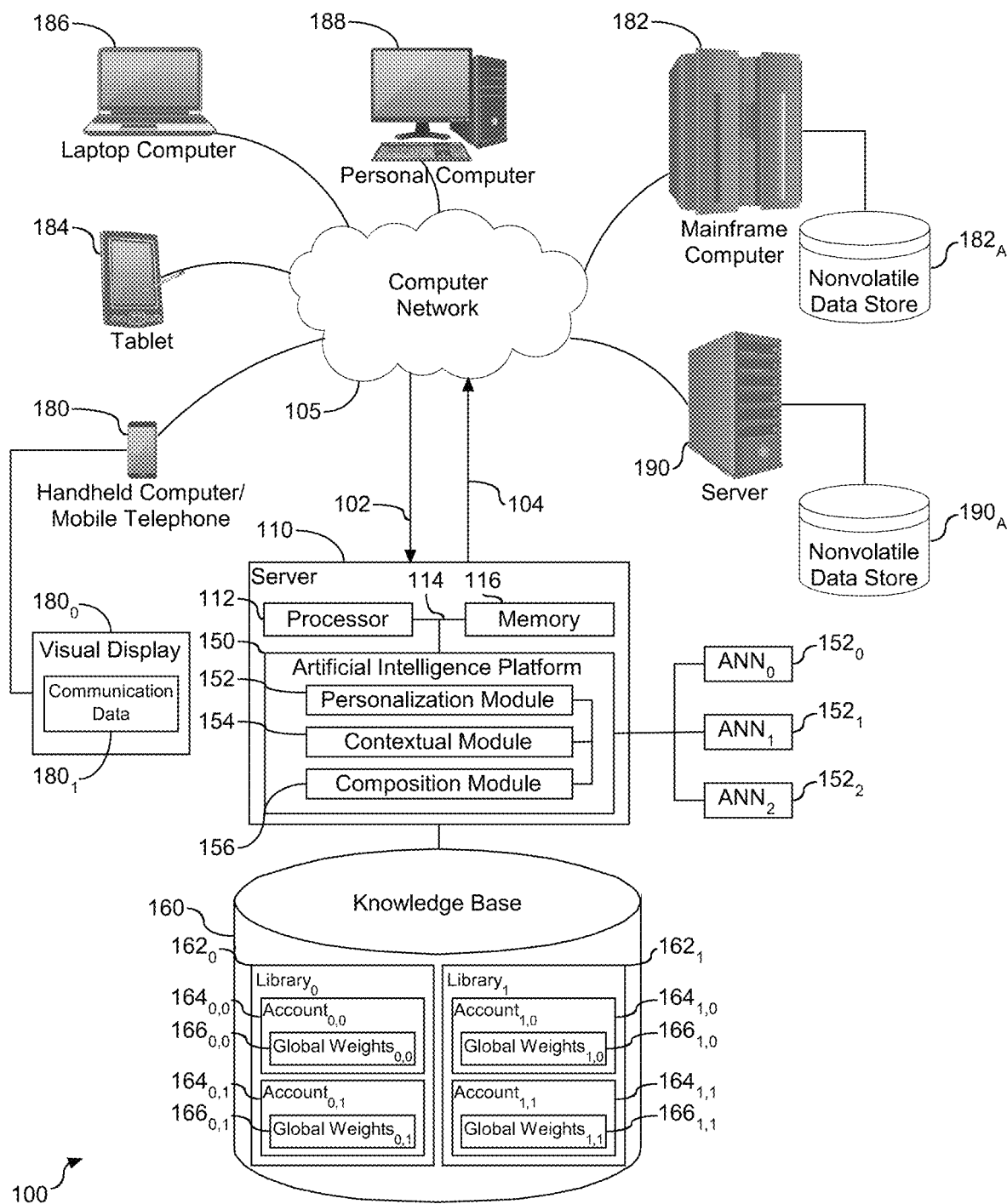
FIG. 1 depicts a system diagram illustrating an artificial intelligence (AI) platform computing system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of products, systems, and processes that are consistent with the embodiments as claimed herein.

Artificial Intelligence ("AI") relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language ("NL") systems (such as the IBM Watson® artificially intelligent computer system or other natural language interrogatory answering systems) process NL based on system acquired knowledge.

In the field of AI computer systems, natural language processing ("NLP") systems process natural language based on acquired knowledge. NLP is a field of AI that functions as a translation platform between computer and human languages. More specifically, NLP enables computers to analyze and understand human language. Natural Language Understanding ("NLU") is a category of NLP that is directed at parsing and translating input according to natural language principles. Examples of such NLP systems are the IBM Watson® artificial intelligent computer system and other natural language question answering systems.

Machine learning ("ML"), which is a subset of AI, utilizes algorithms to learn from data and create foresights based on the data. ML is the application of AI through creation of models, for example, artificial neural networks that can demonstrate learning behavior by performing tasks that are not explicitly programmed. There are different types of ML including learning problems, such as supervised, unsupervised, and reinforcement learning, hybrid learning problems, such as semi-supervised, self-supervised, and multi-instance learning, statistical inference, such as inductive, deductive, and transductive learning, and learning techniques, such as multi-task, active, online, transfer, and ensemble learning.

At the core of AI and associated reasoning lies the concept of similarity. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding NL and processing content response to the identification and understanding as well as changes to the structures are extremely difficult at a practical level.

Artificial neural networks (ANNs) are models of the way the nervous system operates. Basic units are referred to as neurons, which are typically organized into layers. The ANN works by simulating a large number of interconnected processing units that resemble abstract versions of neurons. There are typically three parts in an ANN, including an input layer, with units representing input fields, one or more hidden layers, and an output layer, with a unit or units representing target field(s). The units are connected with varying connection strengths or weights. Input data are presented to the first layer, and values are propagated from each neuron to some neurons in the next layer. At a basic level, each layer of the neural network includes one or more operators or functions operatively coupled to output and input. The outputs of evaluating the activation functions of each neuron with provided inputs are referred to herein as activations. Complex neural networks are designed to emulate how the human brain works, so computers can be trained to support poorly defined abstractions and problems where training data is available. ANNs are often used in image recognition, speech, and computer vision applications.

With the advent of mobile communication devices, text based communications have become common through various applications and platforms. Autocorrect is a software program that identifies misspelled words, identifies one or more words likely to have been intended, and edits corresponding text accordingly. In an exemplary embodiment, autocorrect corrects misspellings in text based communications as the communication is being typed, and may improve typing accuracy. There are different forms of autocorrect algorithms, with the common goal of replacing misspellings with intended text. Autocorrect algorithms use one or more operatively coupled pre-defined dictionaries to suggest or complete the next word or multiple words for sentence completion, or focuses on grammatical and spelling corrections. These approaches do not account for context, e.g. time, location, or activity, or the writing system, to compose sentences.

It is, therefore, an objective of the embodiments disclosed herein to provide a system, a software program product, and a method for dynamically providing context aware text suggestions to facilitate information input, increase communication speed, and yield improved user experience and time efficiency.

Referring to FIG. 1, a schematic diagram of an artificial intelligence (AI) platform computing system (100) is depicted. The system (100) is configured to generate real-time NL output data corresponding to dynamically identify contextual information. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an AI platform (150) for cognitive computing, including natural language processing (NLP) and machine learning (ML), across the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network (105) enable communication detection, recognition, and resolution via one or more network connections, such as (102) and (104). Other embodiments of the server (110) may be used with components, systems, sub-systems, and/or devices other than those that are depicted herein.

The AI platform (150) is shown in FIG. 1 configured with tools to combine entered or captured data, such as text, with a personalized writing style and dynamic contextual information, to compose one or more communication suggestions. The tools shown herein include a personalization module (152), a contextual module (154), and a composition module (156). As further shown herein, the personalization module (152) is operatively coupled to two ML models, referred to shown herein as $ANN_0$ ($152_0$) and $ANN_1$ ($152_1$). In an exemplary embodiment, $ANN_0$ ($152_0$) is referred to as a global model and $ANN_1$ ($152_1$) is referred to as a local model. The personalization module (152) utilizes active learning to observe writing style changes by continuously collecting corresponding data and determining characteristics of writing styles.

The global model, $ANN_0$ ($152_0$), investigates text based communications across one or more application platforms, including social media, texting platforms, etc., corresponding to a user. In an exemplary embodiment, the global model functions on a permissive basis to selectively identify platforms to be investigated. The global model, $ANN_0$ ($152_0$), utilizes data gathered from the text based communications to derive a writing style as model output for the corresponding user. In an exemplary embodiment, the global model, $ANN_0$ ($152_0$), dynamically investigates data in relation to an active communication platform, which includes identifying active applications and associated communication styles. Examples of writing styles include, but are not limited to, use of a digital image or icon to express an idea, emotion, etc., also known as an emoji. In addition, the global model, $ANN_0$ ($152_0$), dynamically investigates and captures communication dynamics and refines the model and corresponding model output based on detected communication dynamics as interactions continue to be detected or identified. Examples of communication dynamics include, but are not limited to, variability of the writing style, such as politeness and abbreviations according to different contacts, locations, time of data, and communication platform.

As shown herein, the AI platform (150) is operatively coupled to a knowledge base (160), which is shown herein with two or more libraries, including a first $library_0$ ($162_0$) and a second $library_1$ ($162_1$). Although two libraries are shown, this quantity should not be considered limiting. One or more of the libraries stores user data reflected as the weights associated with the global model(s), $ANN_0$ ($152_0$), and one or more of the libraries stores weights associated with the local model(s), $ANN_1$ ($152_1$). As shown by way of example, $library_0$ ($162_0$) is shown with data corresponding to users or accounts and their corresponding global writing styles as captured by the global model, $ANN_0$ ($152_0$). For descriptive purposes, $library_0$ ($162_0$) is shown with two accounts, including $account_{0,0}$ ($164_{0,0}$) and $account_{0,1}$ ($164_{0,1}$). Each account corresponds to a user and is populated with data corresponding to the user's global writing style as captured in the weights of the global model, $ANN_0$ ($152_0$). By way of example, $account_{0,0}$ ($164_{0,0}$) has corresponding global $weights_{0,0}$ ($166_{0,0}$) and $account_{0,1}$ ($164_{0,1}$) has corresponding global $weights_{0,1}$ ($166_{0,1}$). As data is gathered and processed by the global model for a specific account, e.g. user, the model output and weights are subject to change.

The local model, $ANN_1$ ($152_1$), investigates text based communications for each writer-receiver pair, taking into account a writer's particular communication with a given receiver. In an exemplary embodiment, a local model is created for each writer-receiver pair. Although only one local model is shown, it is understood that there may be a plurality of local models operatively coupled to the AI platform (150) to identify and reflect a plurality of writer-receiver pairs. The local model, $ANN_1$ ($152_1$), modulates the global writing or characteristic style to capture differences in writing styles for a specific relationship. In an exemplary embodiment, the local model, $ANN_1$ ($152_1$), modifies the global characteristics data derived from the weights of the global model, $ANN_0$ ($152_0$), with the modification incorporating the captured local writing style between a corresponding writer-receiver pair. The second $library_1$ ($162_1$) is shown with two accounts, including $account_{1,0}$ ($164_{1,0}$) and $account_{1,1}$ ($164_{1,1}$). Each account stores data from the local model, $ANN_1$ ($152_1$), and in an exemplary embodiment stores the output and weights of the local model, also referred to herein as local model data, for a specific relationship between two or more writers and receivers, e.g. users. By way of example, $account_{1,0}$ ($164_{1,0}$) is shown herein with local model $data_{1,0}$ ($166_{1,0}$) and $account_{1,1}$ ($164_{1,1}$) is shown herein with local model $data_{1,1}$ ($166_{1,1}$). For example, it is understood that a writer-receiver pair of a parent and child may have a formal writing style in comparison to a writer-receiver pair of a child and child, which may have an informal writing style. Accordingly, the local model modulates the weights of the global model to reflect specific writer-receiver correspondence and associated correspondence style(s).

The contextual module (154) is shown herein operatively coupled to both the personalization module (152) and the composition module (156). As further shown herein, the contextual module (154) is operatively coupled to a ML model, referred to shown herein as a context model, $ANN_2$ ($152_2$). The context model (154) utilizes active learning to dynamically identify contextual information, including device metadata. Examples of contextual data include, but are not limited to, time, location, activity, and communication type. Time context data includes, but is not limited to, time of day, day of the week, time of year, seasons, festivals, holidays, etc.; location includes, but is not limited to, global position system (GPS) data as enabled by a corresponding physical device; activity data includes, but is not limited to, sensor enabled devices, such as a home assistant, step counter, etc. In an exemplary embodiment, contextual data is derived from one or more active or running applications, and metadata associated with the one or more active or running applications in use on the device during the correspondence period. With respect to communication type, it is understood that different communication styles may correspond to writer-receiver pair relationships and the type of communication being conducted. Examples of these different communication styles include, but are not limited to, professional or official communication, social communication with friends, and family related communications. Professional or official communications may be directed to tasks and professional positions and conduct. Social communications may be prone to the use of slang within the communication(s) and is generally based on discussing personal interests and activities. Family related communication may be directed at connections and planning of family events and gatherings. Accordingly, the context model $ANN_2$ ($152_2$) captures local data associated with a physical hardware device.

The composition module (156), shown herein operatively coupled to both the NL module (152) and the contextual model (154), functions to generate output NL communication data in real-time. More specifically, the composition module (156) uses context received or obtained from the context model $ANN_2$ ($152_2$), such as time, location, activity, and communication type, considers the global writing style determined by the global model, $ANN_0$ ($152_0$), such as politeness and abbreviations according to different contacts, location(s), time, and application platform, and the output from the local model, $ANN_1$ ($152_1$), such as a captured local writing style between a corresponding writer-receiver pair. The composition module (156) employs NL generation (NLG) to generate output in the form of a NL grammatical sentence from non-language input(s), which in an exemplary embodiment is proposed as a suggestion. NLG is a software process that transforms structured data, such as output generated by one or more of the models and/or captured device metadata, including contextual information and device metadata into a textual format. In an embodiment, the generated sentence is communicated across the network (105) to an operatively coupled device. Similarly, in an embodiment, the generated textual data is a proposed written response that incorporates text to fill in gaps or openings within the communication with available words or context from the global and local models, $ANN_0$ ($152_0$) and $ANN_1$ ($152_1$), respectively, and from the device metadata. Accordingly, the composition module (156) incorporates communication dynamics from the modulated global writing or characteristic data and the dynamically identified contextual information.

As shown herein, one or more of the computing devices (180), (182), (184), (186), (188), and (190) is in communication with the server (110) via the network (105) and one or more corresponding communication channels (102) and (104). By way of example, computing device (180) is shown with a visual display ($180_0$) to convey communication data ($180_1$) received from the network (105) across communication channel (104). The visual display ($180_0$) functions as an interface, e.g. a user interface (UI), associated with the proposed communications as generated by the composition module (156). The UI functions as a venue to selectively accept the proposed communication, and to transmit the proposed communication across the network (105) to a designated receiving device. In an embodiment, the proposed communication may be selected in-part or rejected, with the UI providing the venue and functionality to support these actions. A selection in-part includes identification and replacement of a data element within the proposed communication. In an exemplary embodiment, the identified and replaced data element may be a word, a phrase, an emoji, or a combination thereof. Replacement of an element includes expanding, contracting, or deleting a data element, or in an embodiment a metadata element, from context of the generated communication, and takes place via interaction through the UI. The selection in-part or rejection of the proposed communication is communicated across the network (105) via communication channel (102) to the server, and the AI platform (150). The composition module (156) functions to re-generate NL output communication data in real-time with a subsequent proposed communication incorporating the replaced identified data or metadata element.

As shown and described, the visual display ($180_0$) and corresponding UI functions as a venue for selective acceptance or rejection of the proposed communication. In an exemplary embodiment, the visual display ($180_0$) is a capacitive touch screen that uses conductive touch of a user or a specialized input device. The visual display ($180_0$) is configured to detect a modification of a metadata element that corresponds to or is related to the generated NL output communication data ($180_1$). One or more examples of metadata element modification of the proposed communication metadata include expansion, contraction, and/or deletion, as related to the communication in whole or in-part. The capacitive touch screen supports use of the visual display to accept, reject, or select or reject in-part proposed communication data, as shown and described in FIG. 5. For example, generated text in its entirety may be selected via the visual display to signal or indicate rejection and a request for the composition of new or replacement text. Similarly, in an exemplary embodiment, a word or group of words may be selected to indicate a request to add details to the generated text. In an embodiment, the selection may be in the form of pressing and/or holding on the word or group of words be applying pressure to the corresponding region of the visual display. Similarly, in an embodiment, the selection may be in the form of a tap on the word or group of words in a designated sequence to indicate removal of the selection, or swiping over a word or group of words to indicate removal of the selection.

In some illustrative embodiments, server (110) may be the IBM Watson® system available from International Business Machines Corporation of Armonk, New York, which is augmented with the mechanisms of the illustrative embodiments described hereafter. The personalization module (152), a contextual module (154), and a composition module (156), hereinafter referred to collectively as AI tools, are shown as being embodied in or integrated within the AI platform (150) of the server (110). In an embodiment, the AI tools may be implemented in a separate computing system (e.g., server 190) that is connected across network (105) to the server (110). Wherever embodied, the AI tools function to support personalization of writing and communicating through context aware suggestions. Entered text, by a sender or receiver, is combined by the AI tools with a corresponding personalized style of writing and dynamic contextual information, to compose NL sentence suggestions. Furthermore, the sender or receiver can selectively amend the composed NL sentence suggestions, followed by a dynamic re-generation of the sentence.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190$_A$), and mainframe computer (182) utilizes nonvolatile data store (182a). The nonvolatile data store (182$_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
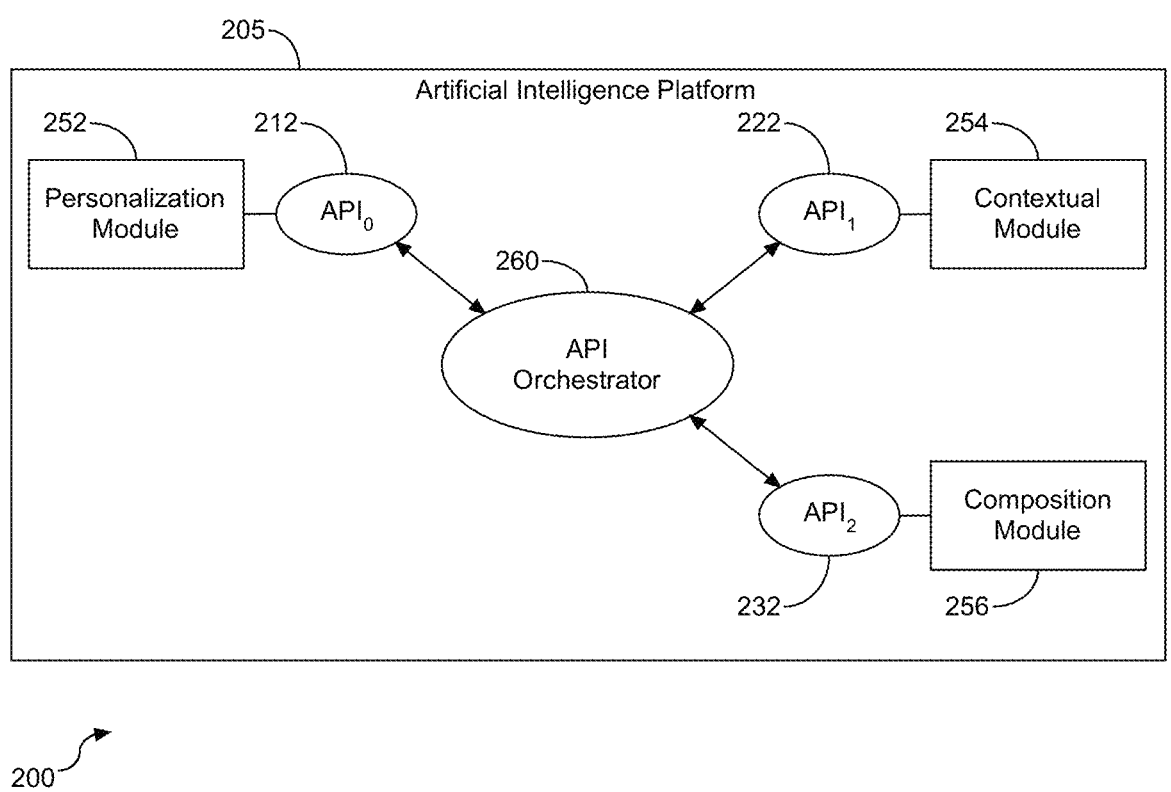
FIG. 2 depicts a block diagram illustrating artificial intelligence platform tools, as shown and described in FIG. 1, and their associated application program interfaces.

An Application Program Interface (API) is understood in the art as a software intermediary between two or more applications. With respect to the artificial intelligence platform (150) shown and described in FIG. 1, one or more APIs may be utilized to support one or more of the tools (152), (154), and (156) and their associated functionality. Referring to FIG. 2, a block diagram (200) is provided illustrating the tools (152), (154), and (156) and their associated APIs. As shown, a plurality of tools are embedded within the artificial intelligence platform (205), with the tools including a personalization module (252) associated with API$_0$ (212), a contextual module (254) associated with API$_1$ (222), and a composition module (256) associated with API$_2$ (232). Each of the APIs may be implemented in one or more languages and interface specifications.

As shown, API$_0$ (212) is configured to support and enable the functionality represented by the personalization module (252). API$_0$ (212) provides functional support to manage and leverage the global and local models, ANN$_0$ (152$_0$) and ANN$_1$ (152$_1$), respectively. More specifically, API$_0$ (212) supports active learning to investigate communication platforms, derive and modulate global characteristic data, and capture local writing style(s), including observe writing style changes by continuously collecting corresponding data and determining characteristics of writing styles; API$_1$ (222) provides functional support to dynamically identify contextual information, and in an exemplary embodiment leverage device metadata; and API$_2$ (232) provides functional support to generate real-time NL communication data responsive to the global characteristic data and the dynamically identified contextual information. As shown, each of the APIs (212), (222), and (232) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. In another embodiment, the functionality of the separate APIs may be further divided into additional APIs. As such, the configuration of the APIs shown herein should not be considered limiting. Accordingly, as shown herein, the functionality of the tools may be embodied or supported by their respective APIs.

Figure 3:
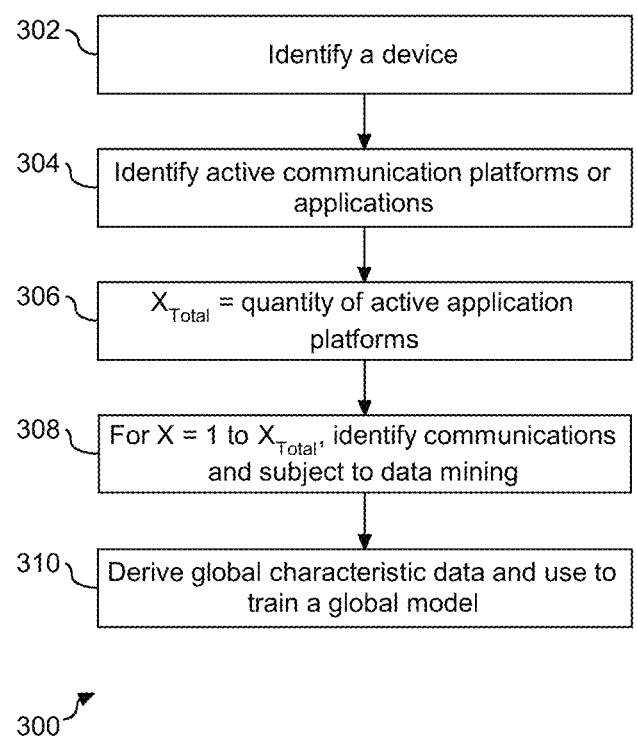
FIG. 3 depicts a flowchart illustrating a process for training a global artificial neural network.

Referring to FIG. 3, a flow chart (300) is provided to illustrate training of a global artificial neural network, shown and described in FIG. 1 a global model, ANN$_0$ (152$_0$). The global model is directed to global characteristic data for a device. As shown, a physical device is designated or otherwise identified (302). One or more active communication platforms or applications associated with the device are identified (304), and the quantity of the activate application platforms is assigned to the variable X$_{Total}$ (306). In an exemplary embodiment, an active platform may be an open application, or in an embodiment, an application operating in the background. Examples of the application platforms include texting applications, electronic mail applications, social media applications, etc. For each of the platforms identified, communications are identified and subject to data investigating (308). Data investigating is a process of analyzing patterns, including hidden patterns, according to different perspectives for categorization into useful information. In an exemplary embodiment, data investigating is also referred to herein as data discovery and knowledge discovery. The data investigating herein is directed at deriving a writing style model of that user that captures variability in their writing style. Examples of the writing style includes, use of text, emojis, shorthand, abbreviations, politeness, and variation of such style based on contacts, location, time of day, and application.

Global characteristic data pertaining to writing style characteristics is derived from the data investigating and used to train a global model (310), ANN$_0$ (152$_0$). In an exemplary embodiment, active learning is the protocol employed for training the global model. Similarly, in an exemplary embodiment, the data investigating and deriving of writing style characteristics is continuous and aligned with detection and identification of communications. Accordingly, the global model is directed at an individual device or user, and leverages captured communications and communication data to derived writing style characteristics.

Figure 4:
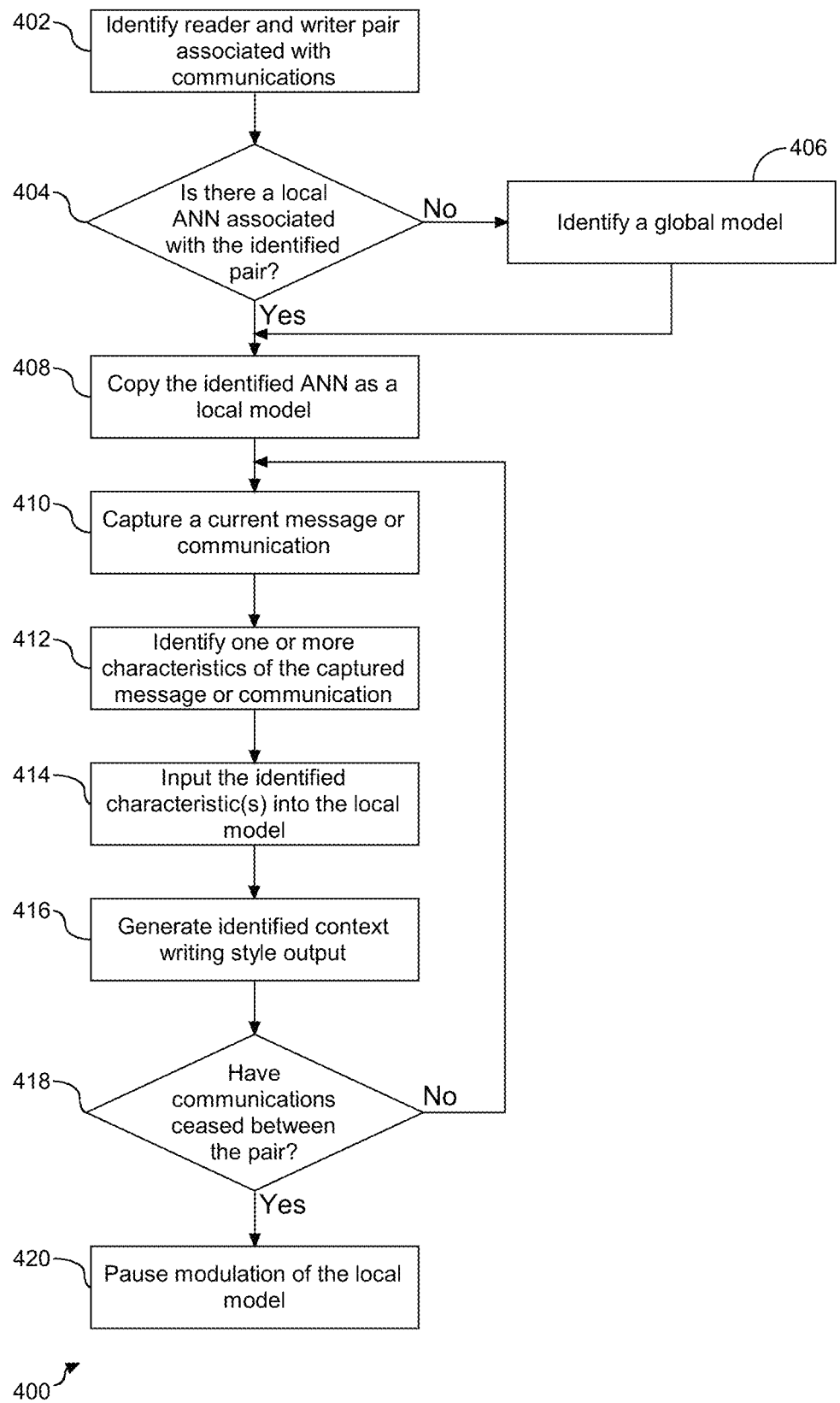
FIG. 4 depicts a flowchart illustrating a process for training a local ANN directed at a writer-receiver communication pair.

Referring to FIG. 4, a flow chart (400) is provided to illustrate training a local ANN directed at a writer-receiver communication pair. Communications that transpire between a specific writer and specific reader are referred to herein as a writer-reader pair. Some of these pairs may have had prior communications, wherein the writer-reader pair has had prior electronic communications with each other, while other pairs may be new communications, wherein the writer-reader pair has no prior electronic communications with each other. At the same time, although the writer and reader in the pair may not have had prior communications with each other, they may have individually had electronic communications with other entities. The process shown herein starts with identifying and/or detecting communications and correspondence, and specifically the writer and reader associated with the identified and/or detected communications (402). It is then determined if there is a local ANN associated with the identified writer-reader pair for the identified communication(s) (404). A negative response to the determination is following by identifying a global model for the writer in the writer-reader pair (406). Alternatively, or if a global model is not apparent or available for the writer, then a global model for the reader in the writer-reader pair is identified at step (406). Following step (406) or a positive response to the determination at step (404), the identified ANN for the writer-reader pair or the global model identified for the writer, or in an exemplary embodiment the reader, is copied as a local model (408). A current message or communication is captured (410) and one or more characteristics of the captured message or communication are identified (412). In an embodiment, the captured characteristic identifies the content of the message as formal or informal, although in an exemplary embodiment additional or alternative characteristic categories may be identified. The identified characteristic is used and presented as input for the local model, and the weights of the local model are modulated with data corresponding to the identified characteristic(s) (414).

As further shown, one or more communications between a writer-reader pair may include multiple communications sent and received between the entities. Following step (414), output from the local model is generated in the form of identification of the context writing style associated with the writer-reader pair (416). It is understood that communication associated with a writer-reader pair may continue, temporarily cease, or conclude. The output at step (416) is intended to capture the context writing style, which in an exemplary embodiment is subject to evolution as communications continue to be detected or otherwise ascertained. As shown herein by way of example, following step (416) it is determined if communications between the writer and reader have concluded (418). At such time as a subsequent communication in the writer-reader pair is detected or identified, including a sent or received communication, e.g. email, text, social media post, etc., and as demonstrated by a negative response to the determination, the process returns to step (410). Similarly, at such time as the communications cease or are otherwise not detected between the writer-reader pair, as demonstrated by a positive response to the determination, the modulation of the local model is paused until such time as further communications between the writer-reader pair are detected or identified (420). In an exemplary embodiment, the local model identifies the context style from a prior set of communications of the writer-reader pair, or following an evaluation of an initial or set of initial communications, thereby creating an initial output or projection of the context style prior to the end of the writer-reader communication(s). Accordingly, the local model is directed at identification of characteristics of a writing style between two or more entities, e.g. writer and reader.

Figure 5:
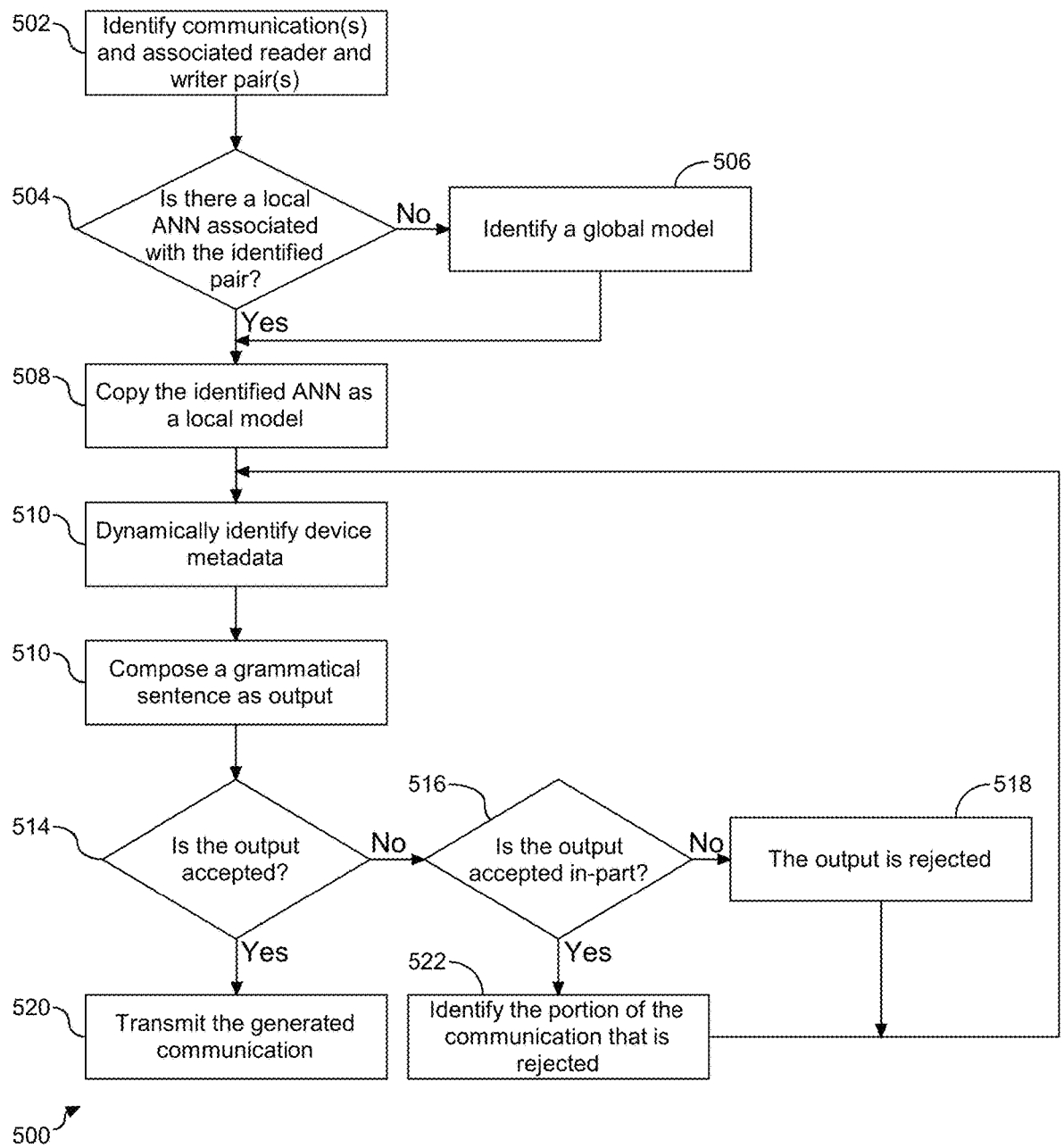
FIG. 5 depicts a flowchart illustrating a process for identifying device context and dynamically leveraging the context into a composition.

Referring to FIG. 5, a flow chart (500) is provided to illustrate a process of identifying device context and dynamically leveraging the context into a composition. The process shown herein starts with identifying one or more communications and correspondence, and specifically the writer and reader associated with the communication(s) (502). Similar to the process shown and described in FIG. 4, it is then determined if there is a local ANN associated with the identified writer-reader pair for the identified communication(s) (504). A negative response to the determination is following by identifying a global model for the writer in the writer-reader pair (506). Alternatively, or if a global model is not apparent or available for the writer, then at step (504) a global model for the reader in the writer-reader pair is identified. Following step (506) or a positive response to the determination at step (504), the identified local ANN, e.g. $ANN_2$, for the writer-reader pair or the global model identified for the writer, or the reader, is copied as a local model (508). In an exemplary embodiment, the local ANN shown and described with respect to device context e.g. $ANN_2$, may be separate from the local model shown and described in FIG. 4, e.g. $ANN_1$, for identification of context style, or in an embodiment, the two local models may be combined into a single local model. Similarly, in an embodiment, the local model, $ANN_2$, may be separate for the reader and the writer in the writer-reader pair. Following step (508), device metadata is dynamically identified (510). In an exemplary embodiment, the identified local model, e.g. $ANN_2$, is utilized at step (510) for the device metadata identification. If the local model is directed at the reader, then the local model identifies the physical device corresponding to the reader and the reader device metadata, and if the local model is directed at the writer, then the local model identifies the physical device corresponding with the writer and the writer device metadata. Accordingly, the local model is directed to the writer-reader pair, and is configured to identify local device metadata.

Device metadata is directed at physical aspects of the local hardware device. Examples of contextual data include, but are not limited to, time, location, activity, and communication type. Time context data includes, but is not limited to, time of day, day of the week, time of year, seasons, festivals, holidays, etc.; location includes, but is not limited to, global position system (GPS) data as enabled by a corresponding physical device; activity data includes, but is not limited to, sensor enabled devices, such as a home assistant, step counter, etc. In an exemplary embodiment, contextual data is derived from one or more active or running applications, and metadata associated with the one or more active or running applications in use on the device, e.g. physical device, during the correspondence period.

Following step (510), natural language generation (NLG) is employed to compose and generate output in the form of a NL grammatical sentence, e.g. textual format, from non-language input(s), which in an exemplary embodiment is proposed as a suggested communication. NLG is a software process that transforms structured data, such as output generated by one or more of the models and/or captured device metadata. At step (512), the NLG transforms structured data, such as output generated by one or more of the models and/or captured device metadata, including contextual information and device metadata, into a textual format. In an exemplary embodiment, the NLG utilizes output from the global model to capture or filter, the writing style, and/or local model(s) to capture the context style, and further utilizes captured device metadata to fill in gaps or complete the formulated textual data with respect to the writing and context styles. The NLG output is an expression of the user through the user's model output that function as a filter to express writing style and personalization for a given user and corresponding platform. The NLG output is presented through an interface for selective acceptance. In an exemplary embodiment, the interface is a visual display, which functions as a venue to interactively convey the proposed communication, which may be accepted (514), selected in-part (516), or rejected (518), with the UI providing the venue and functionality to support these actions. A selection in-part includes identification and replacement of a data element within the proposed communication. In an exemplary embodiment, the identified and replaced data element may be a word, a phrase, an emoji, or a combination thereof. Replacement of an element includes expanding, contracting, or deleting a data element, or in an embodiment a metadata element, from context of the generated communication, and takes place via interaction through the UI.

As shown, an acceptance of the proposed communication at step (514) is followed by transmission of the generated communication (520). Similarly, if the generated output is not accepted in its entirety at step (514), it is then determined if the proposed communication has been selected in-part (516), also referred to herein as an acceptance-in part or a rejection in-part. A positive response to the determination at step (516) is followed by identification of the portion of the text that is rejected (522), and a return to step (510) to identify data to replace the rejected portion(s). In an embodiment, the inverse principle may be employed with the selection in-part identifying the portion of the communication that is accepted at step (522), and the return to step (510) is conducted to identify data to augment the accepted communication. As further shown, a rejection of the generated communication is its entirety, as demonstrated by a negative response to the determination at step (516) is followed by a return to step (510) to generate replacement of the communication in its entirety. The process of selective acceptance of textual data and re-generation thereof takes place in real-time to support and maintain an active communication between the writer-receiver pair.

The following is an example to support the global and local models together with the NLG. A reader receives and opens a message on their local device, such as a cell-phone or tablet, with the message inquiring about what the current activity of the reader. The composition module (156) suggests a composition of one or more phrases or sentences, capturing dynamic contextual awareness data including output from context model $ANN_2$ ($152_2$), such as time, location, activity, and communication type, output from the global model, $ANN_0$ ($152_0$), such as politeness and abbreviations according to different contacts, location(s), time, and application platform, output from the local model, $ANN_1$ ($152_1$), such as a captured local writing style between the corresponding writer-receiver pair, and device metadata. The reader may transmit the proposed phrase(s) or sentence(s), selectively accept or reject parts, or reject the proposal in its entirety. In an embodiment, the reader may choose to ignore the proposed phrase(s) or sentence(s), and return to generate a response at a later time, which in an exemplary embodiment may re-generate one or more phrase(s) or sentence(s) with different context due to different output from one or more of the models and updated device metadata. Accordingly, generation and re-generation of textual data support interaction and receipt and detection of input data.

As shown and described in FIGS. 1-5, activity data is dynamically derived from applications and correspondence, and used to determine a chronological order of events and to capture device metadata. Aspects of the tools and managers, e.g., (152), (154), and (156) and their associated functionality may be embodied in a computer system/server in a single location, or in an embodiment, may be configured in a cloud-based system sharing computing resources. With references to FIG. 6, a block diagram (600) is provided illustrating an example of a computer system/server (602), hereinafter referred to as a host (602) in communication with a cloud based support system, to implement the processes described above with respect to FIGS. 3-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
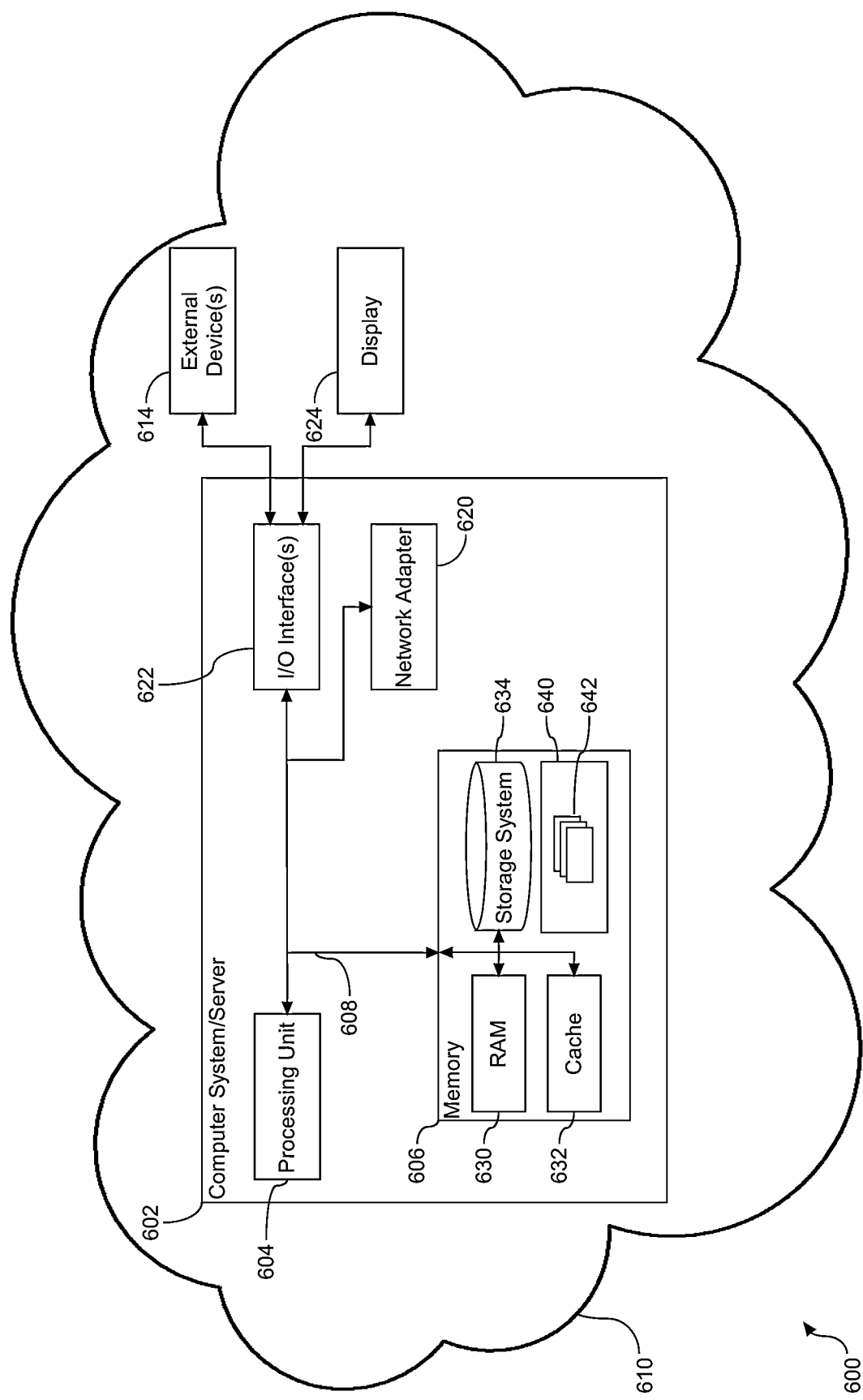
FIG. 6 depicts a block diagram illustrating an example of a computer system/server of a cloud based support system, to implement the system, product, and processes described above with respect to FIGS. 1-5.

As shown in FIG. 6, host (602) is shown in the form of a general-purpose computing device. The components of host (602) may include, but are not limited to, one or more processors or processing units (604), e.g., hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to identify one or more re-factoring operations for source code, which when applied to the source code produce one or more micro-service candidates. For example, the set of program modules (642) may include the tools (152), (154), and (156) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In an embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In an embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
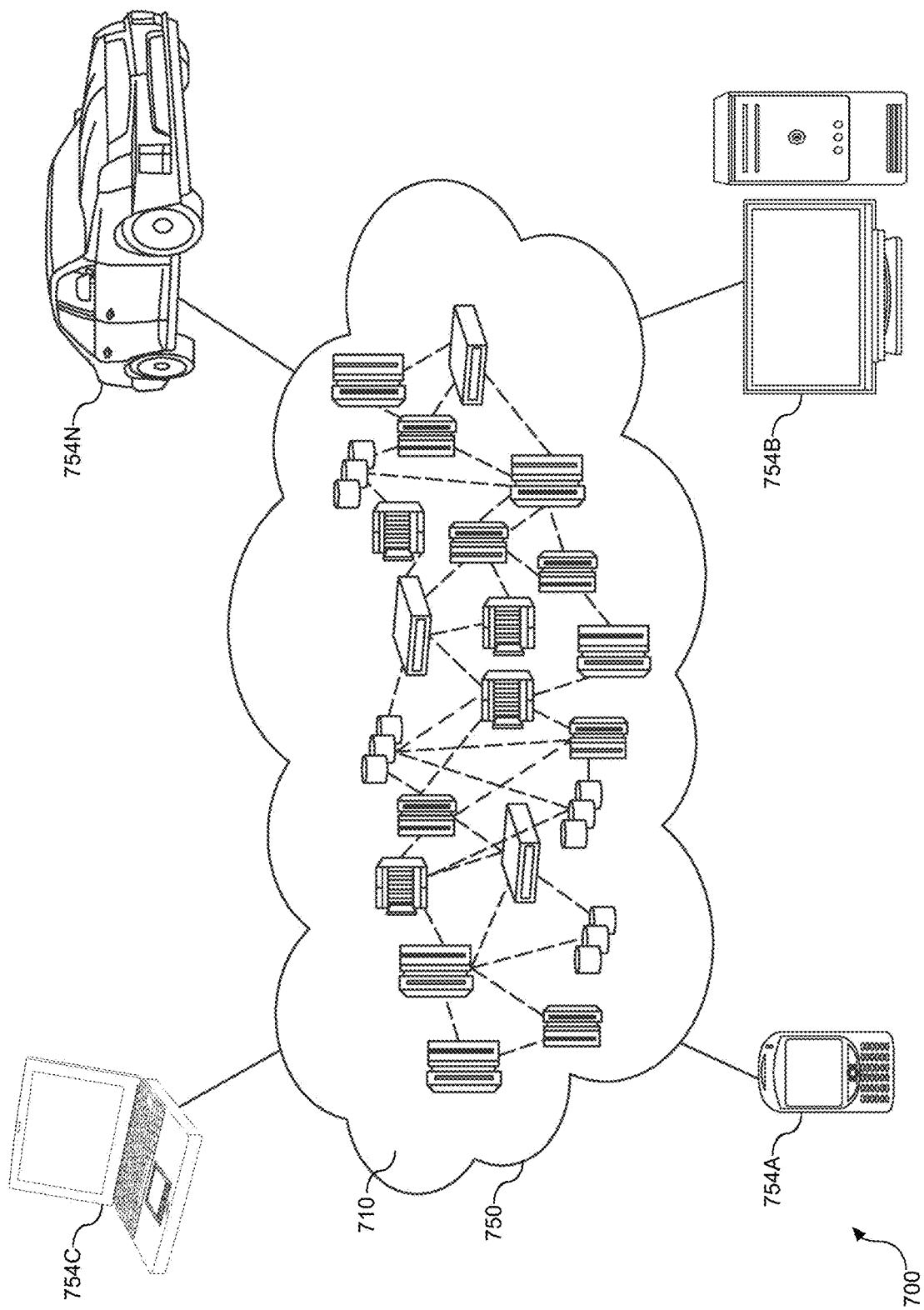
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
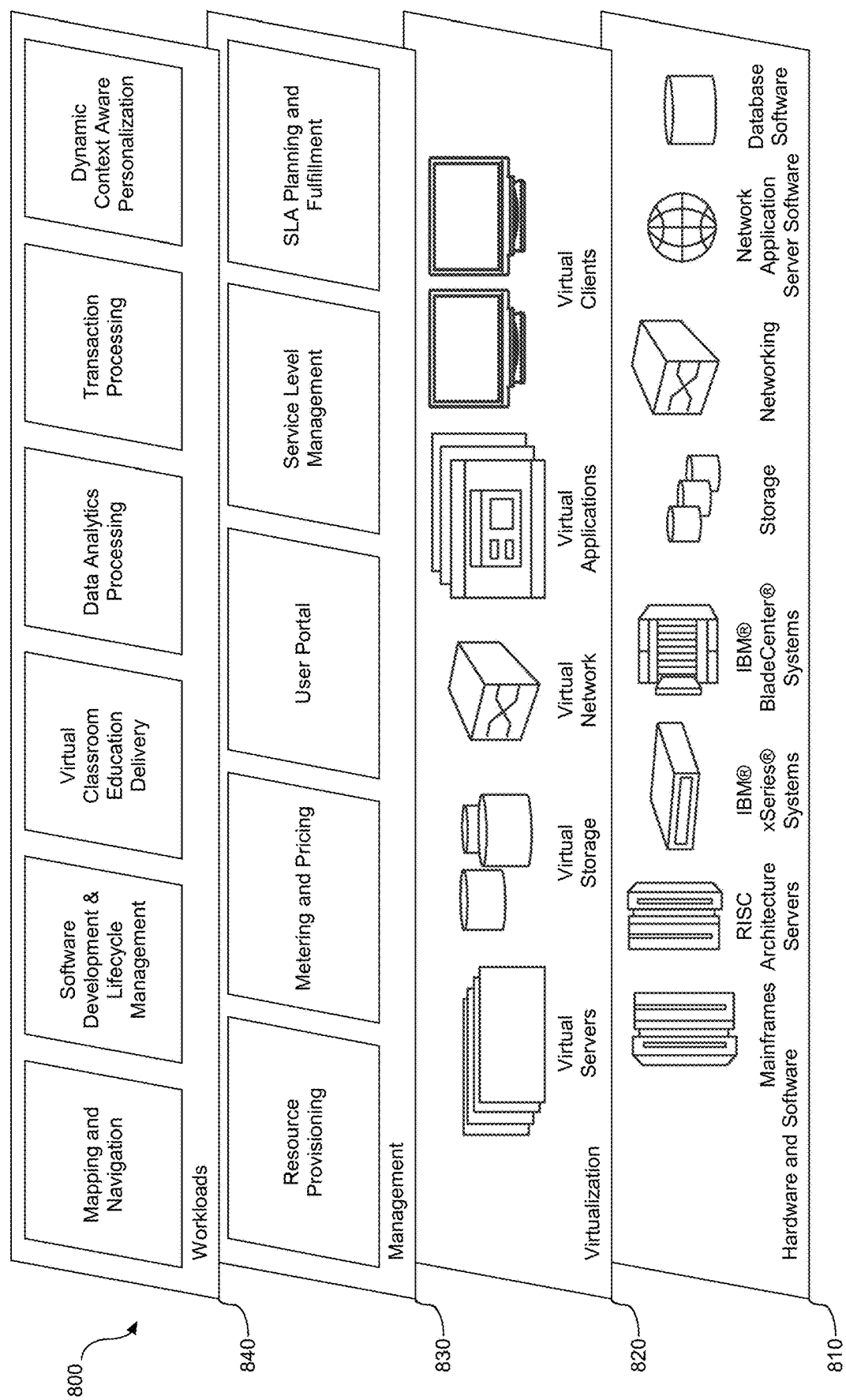
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In an example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized.

Examples of workloads and functions which may be provided from this layer include, but are not limited to: mapping and navigation; software development and lifecycle management; virtual classroom education delivery; data analytics processing; transaction processing; and dynamic context aware personalization.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to train a ML model and leverage the trained model to classify micro-services with respect to compliance requirements.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising: a processor operatively coupled to memory; and
an artificial intelligence (AI) platform, in communication with the processor, having one or more tools, the tools comprising:
a personalization module configured to:
selectively identify, on a permissive basis, a plurality of communication platforms for which text data is to be investigated;
capture the text data, provided to the plurality of communication platforms, by a device associated with a writer;
process the text data captured via a first set of one or more weights of a first artificial neural network derived from global writing style data for the writer, wherein the global writing style data comprises variability of writing style, politeness or use of abbreviations, wherein the first artificial neural network is a global network and wherein the global writing style data is derived from the text data provided to the plurality of communication platforms and is not dependent on a specific relationship between a writer and a reader;

modify the global writing style data for the writer via a second set of one or more weights of a second artificial neural network, wherein the second artificial neural network is dependent on the specific relationship between the writer and the reader and is based on a local writing style between the writer and the reader;

a contextual model configured to dynamically identify contextual information; and a composition module configured to generate in real-time natural language (NL) output, including incorporate communication dynamics from the modified global writing style data and the dynamically identified contextual information; and a knowledge base operatively coupled to the AI platform, the knowledge base comprising:
  a first library that stores:
    a first account corresponding to the writer and comprising the first set of one or more weights of the first artificial neural network derived from the global writing style data for the writer; or
    a second account corresponding to a second writer and comprising a third set of one or more weights of the first artificial neural network derived from the global writing style data for the second writer, wherein the writer is distinct from the second writer; and
  a second library that stores other accounts corresponding to other writers and comprising respective weights derived from other global writing style data for the other writers, wherein the second library is distinct from the first library.

2. The computer system of claim 1, further comprising an interface configured to provide a venue to selectively accept the generated NL output, including transmit the generated NL output, accept the generated NL output in-part, or reject the generated NL output.

3. The computer system of claim 2, wherein acceptance of the generated NL output in-part includes selective identification of an element within the generated NL output and replacement of the identified element, and further comprising the composition module configured to re-generate NL output in real-time with the replaced identified element.

4. The computer system of claim 2, further comprising the interface configured to detect a modification of a metadata element corresponding to the generated NL output, the modification including an expansion, contraction, deletion, or a combination thereof, and a communication module to re-generate NL output in real-time to incorporate the modified metadata element.

5. The computer system of claim 4, further comprising a visual display operatively coupled to the artificial intelligence platform, the visual display including a capacitive sensor configured to generate a signal directed at acceptance or rejection of the generated NL output.

6. The computer system of claim 1, wherein the derivation of the global writing style data comprises investigation of communication dynamics corresponding to an active communication platform.

7. The computer system of claim 1, wherein the contextual information includes time, place, and activity data derived from one or more applications running on the device of the writer, metadata associated with the derived activity data of each of the one or more running applications associated with the device of the writer, or a combination thereof.

8. The computer system of claim 1, wherein the generation of real-time NL output further comprises the composition module to generate a NL grammatical sentence.

9. A computer program product comprising a computer readable storage medium having program code embedded therewith, the program code executable by a processor to:
  selectively identify, on a permissive basis, a plurality of communication platforms for which text data is to be investigated;
  capture the text data, provided to the plurality of communication platforms, by a device associated with a writer;
  process the text data captured via a first set of one or more weights of a first artificial neural network derived from global writing style data for the writer, wherein the global writing style data comprises variability of writing style, politeness or use of abbreviations, wherein the first artificial neural network is a global network and wherein the global writing style data is derived from the text data provided to the plurality of communication platforms and is not dependent on a specific relationship between a writer and a reader;
  modify the global writing style data for the writer via a second set of one or more weights of a second artificial neural network, wherein the second artificial neural network is dependent on the specific relationship between the writer and the reader and is based on a local writing style between the writer and the reader;
  dynamically identify contextual information;
  generate natural language (NL) output in real-time, including incorporate communication dynamics from the modified global writing style data and the dynamically identified contextual information;
  store, via a first library, a first account corresponding to the writer and comprising the first set of one or more weights of the first artificial neural network derived from the global writing style data for the writer; and
  store, via a second library, other accounts corresponding to other writers and comprising respective weights derived from other global writing style data for the other writers, wherein the first library and the second library are distinct and comprised within a knowledge base coupled to an artificial intelligence platform.

10. The computer program product of claim 9, further comprising program code to selectively accept the generated NL output, including transmit the generated NL output, accept the generated NL output in-part, or reject the generated NL output.

11. The computer program product of claim 10, wherein the program code to accept the generated NL output in-part includes selective identification of an element within the generated NL output and replacement of the identified element, and further comprising program code to re-generate NL output in real-time with the replaced identified element.

12. The computer program product of claim 9, further comprising program code to:
  receive modification of a metadata element corresponding to the generated NL output, the modification including expansion, contraction, deletion, or a combination thereof; and
in real-time re-generate NL output incorporating the modified metadata element.

13. The computer program product of claim 9, wherein the contextual information includes time, place, and activity data derived from one or more applications running on the device, metadata associated with the derived activity data of each of the one or more running applications, or a combination thereof.

14. The computer program product of claim 9, wherein the generation of real-time NL output further comprises program code configured to generate a NL grammatical sentence.

15. A computer-implemented method comprising:
   selectively identifying, by a system operatively coupled to a processor, on a permissive basis, a plurality of communication platforms for which text data is to be investigated;
   capturing, by the system, the text data, provided to the plurality of communication platforms, by a device associated with a writer;
   processing, by the system, the text data captured via a first set of one or more weights of a first artificial neural network and derived from global writing style data for the writer, wherein the global writing style data comprises variability of writing style, politeness or use of abbreviations, wherein the first artificial neural network is a global network and wherein the global writing style data is derived from the text data provided to the plurality of communication platforms and is not dependent on a specific relationship between a writer and a reader;
   modifying, by the system, the global writing style data for the writer via a second set of one or more weights of a second artificial neural network, wherein the second artificial neural network is dependent on the specific relationship between the writer and the reader and is based on a local writing style between the writer and the reader;
   dynamically identifying, by the system, contextual information; generating, by the system, in real-time natural language (NL) output, including incorporating communication dynamics from the modified global writing style data and the dynamically identified contextual information; and
   storing, by the system, via a first library, a first account corresponding to the writer and comprising the first set of one or more weights of the first artificial neural network derived from the global writing style data for the writer;
   storing, by the system, via a second library, other accounts corresponding to other writers and comprising respective weights derived from other global writing style data for the other writers, wherein the first library and the second library are distinct and comprised within a knowledge base coupled to an artificial intelligence platform.

16. The computer-implemented method of claim 15, further comprising selectively accepting the generated NL output, including transmitting the generated NL output, accepting the generated NL output in-part, or rejecting the generated NL output.

17. The computer-implemented method of claim 16, wherein accepting the generated NL output in-part includes selectively identifying an element within the generated NL output and replacing the identified element, and further comprising in real-time re-generating NL output with the replaced identified element.

18. The computer-implemented method of claim 16, further comprising modifying a metadata element corresponding to the generated NL output, the modifying including expanding, contracting, deleting, or a combination thereof, and in real-time re-generating NL output incorporating the modified metadata element.

19. The computer-implemented method of claim 16, wherein a deriving of the global writing style data comprises investigating communication dynamics corresponding to an active communication platform.

20. The computer-implemented method of claim 16, wherein the contextual information includes time, place, and activity data derived from one or more applications running on the device, metadata associated with the derived activity data of each of the one or more running applications, or a combination thereof.

* * * * *